Figure 1:
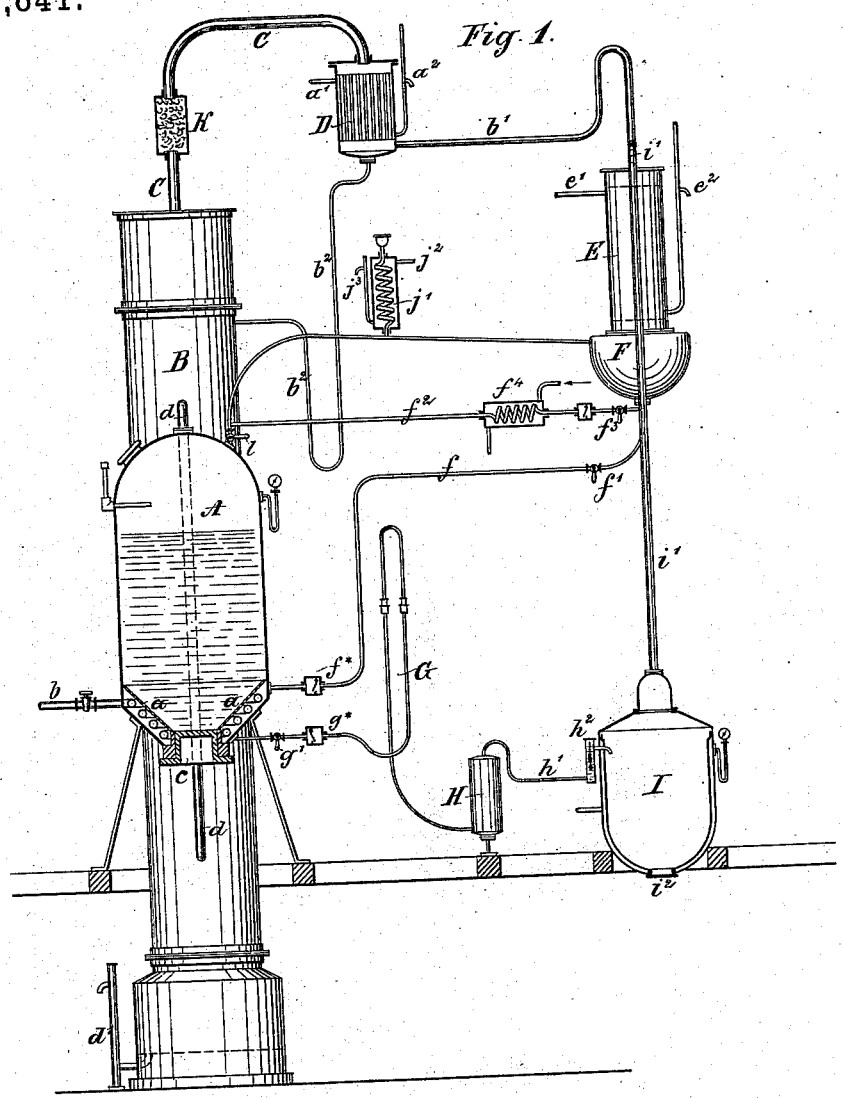

(No Model.)

K. TROBACH.
MANUFACTURE OF SUGAR.

No. 295,841. Patented Mar. 25, 1884.

Witnesses.
J. A. Rutherford
Robert Everett

Inventor
Konrad Trobach.
By James L. Norris.
Atty.

UNITED STATES PATENT OFFICE.

KONRAD TROBACH, OF BERLIN, GERMANY.

MANUFACTURE OF SUGAR.

SPECIFICATION forming part of Letters Patent No. 295,841, dated March 25, 1884.

Application filed February 28, 1884. (No model.)

*To all whom it may concern:*

Be it known that I, KONRAD TROBACH, of the city of Berlin, in the Kingdom of Prussia and German Empire, have invented certain new and useful Improvements in the Manufacture of Sugar, of which the following is a specification, reference being had to the accompanying drawings, and to the letters of reference marked thereon.

This invention relates to the manufacture of sugar; and its object is to produce sugar directly from sugary substances by means of an improved process without resorting to the numerous intermediate processes heretofore employed; and it consists in freeing the sugary substances of their water by means of vaporous spirits or alcohol-steam, and then subjecting the substances thus freed of their water to the action of hot liquid alcohol, in order to extract therefrom the sugar only, by forming a sugary solution or alcoholic liquor, and to rob them of none of their azotic component parts or nutritive salts, which will render them valuable as food for cattle after all the sugar is extracted therefrom; and it also consists in passing the alcoholic liquor or sugary solution through a suitable filter, to neutralize such acid salts as may be contained therein, before separating the alcohol from the sugar in the said alcoholic liquor.

Before entering into a detailed description of my improved process of and apparatus for producing sugar from sugary substances, as above mentioned, I will first state the principles upon which my invention is based—that is to say:

First. The juice of beet-root, sugar-cane, and other sugary substance contains chiefly crystallizable sugar, while uncrystallizable sugar is caused to originate therein, partly from the present mode of treatment, and partly by reason of the changing or "inverting" action of acids, which will assume a concentrated form when the juice is concentrated, dried, or evaporated. Therefore, in order to obviate these difficulties, it must be desirable to have a suitable means for gradually removing the water from the juice of the sugary substances without causing any concentration of the acids to take place, and then, by means of a suitable solvent, to extract the sugar from the said substances, so as to obtain the sugar in a pure and crystallizable state practically unmixed with acids.

Second. As stated in the preceding paragraph, the removal by means of a drying process of the water contained in the sugary substances cannot be recommended, and neither will it be recommendable to extract by means of a solvent—such as alcohol—the sugar contained in the dried substances, first, because of the concentration of the juice of the sugary substances (which concentration results from the drying process) causing the concentrated acids to act with a changing or inverting effect upon the crystallizable sugar, and then because of a thorough extraction of the sugar from the coagulum of the protoplasm being hardly ever attainable. By subjecting, however, the sugary substances to the action of alcohol-steam obtained from highly-rectified alcohol, so that the said alcohol-steam is continually supplied to and passed through the said substances, the latter will be freed rapidly of their water. The albuminates, vegetable jellies, or pectous substances, and gummous combinations, are gradually precipitated to form thin flakes in the juice of the sugary substances, as the latter are freed of their water, the cellular membranes are burst in consequence of the withdrawal of the water, and the cells are opened and the water therein is substituted by alcohol. Volatile acids are carried off by the alcohol-steam. Non-volatile acids are hardly ever present in the sugary juice, and if present are mostly insoluble in alcohol. By continually impregnating with highly-rectified alcohol sugary substances previously freed of their water and opened by means of alcohol-steam, all the sugar contained in the said substances may be caused to combine with the alcohol, so as to form therewith an alcoholic solution, while the pectous and gummous substances, albuminates, and practically all the acids and salts will remain in the residuary mass of the sugary substances.

Third. Passing an alcoholic solution of sugar obtained by extracting the sugar by means of alcohol from sugary substances previously freed of their water by means of alcohol-steam, and containing small quantities of non-volatile acids or acid salts, through a filter composed of lime or chalk, will cause the acids or acid salts contained therein to be bound or neutralized, and sugar will hardly be lost by reason of lime-sugarate being formed. The sugar from the alcoholic solution or liquor thus freed of its acids or acid salts may then be obtained in a practically pure state by parting the alcohol from the solution or liquor.

Fourth. The alcohol which may have remained in the residuary mass of sugary substances after the latter have been treated as mentioned in the preceding paragraphs may be expelled therefrom by converting it into alcohol-steam, when the remaining mass of said substances will form a material containing in a concentrated form all the nutritious matter of the original sugary substances, with the only exception of water and sugar.

Fifth. The sugar arrested as sugarate in a filter composed of lime or chalk may be obtained therefrom in the usual and well-known manner, and the salts that may have been formed in such filter will constitute a valuable means for manuring purposes.

Now, in accordance with the above-stated principles or motives, my said improved process of producing sugar from sugary substances is as follows: The sugary substances—such as shavings of beet-root, triturated beet-root or sugar-cane, glucose, or other equivalent and preferably comminuted material—are placed in a suitable receptacle and subjected to the action of alcohol, preferably in a highly-rectified state, so that when the said alcohol is converted into steam the alcohol-steam thus produced will carry off the water contained in the said sugary substances. The alcohol may be so supplied that on entering the said receptacle containing the sugary substances it will at once be converted into alcohol-steam, and the latter is then passed through the said sugary substances to combine with the water contained in the latter, and thus to free the same of their aqueous component parts. The alcohol-steam, laden with the water with which it has combined during its passage through the said receptacle containing the said sugary substances, is then conducted into a suitable refining apparatus to be rectified again, and is passed through a suitable filter containing lime or chalk, for the purpose of neutralizing such volatile acids as may have combined with the said alcohol-steam during the combination of the latter with the water of the sugary substances. The alcohol-steam may then be subjected to another process of dephlegmation by passing it through a suitable cooling or dephlegmating apparatus. The said steam, being now in a highly-rectified state again, is then passed through another suitable cooling apparatus or condenser, and transformed into its original liquid state again. In this state, and while yet comparatively hot, it may again be supplied to the said receptacle containing the sugary substances, and there be applied in the manner above described, to free the said substances of another part of their water. The sugary substances are thus kept continually in an atmosphere of alcohol-steam, and in such atmosphere they are rapidly freed of their water, without there being any considerable amount of heat required for converting the alcohol into steam, since I propose to condense the circulating alcohol, so as to give it a temperature of about 120° to 150° Fahrenheit, while, as is well known, highly-rectified alcohol allows of being converted into steam when its temperature is raised to only a few degrees more. I continue in this manner until all the water contained in the said sugary substances is removed. This being accomplished, the said sugary substances thus freed of their water are subjected to the action of hot liquid alcohol in order to extract the sugar contained therein; and for this purpose I thoroughly mix the said substances with the said hot alcohol, and pass the alcoholic solution of sugar or liquor thus obtained into a suitable heated vessel. In this vessel the alcohol contained in the said solution of sugar or liquor is transformed into alcohol-steam, and the latter is conducted from the said vessel to some suitable condenser, to be transformed into its former liquid state again, while the sugar contained in the said liquor remains alone in the said vessel. The condensed alcohol may be supplied again to the receptacle containing the sugary substances, to form another solution with the sugar contained in the said substances, and said solution will then be treated again in the same manner as described. The alcohol-steam from the vessel containing the alcoholic liquor is condensed, so that it will have a temperature of about 120° to 150° Fahrenheit, and will not require being heated when applied again for the purpose of extracting further quantities of sugar from the sugary substances. I continue in this manner until all the sugar contained in the said sugary substances freed from their water as described is extracted therefrom. The alcoholic liquor obtained by treating the said sugary substances with hot alcohol in the manner described is passed through a filter composed of chalk or lime before it is allowed to enter the said vessel in which the sugar is separated from the alcohol, in order to neutralize such acid salts as may be contained in the said alcoholic liquor. All the sugar having been extracted from the said sugary substances, the latter are subjected to the action of heat to free them from the remaining traces of alcohol, and will form a very nutritious food for cattle, having lost hardly any of their azotic component parts, or of their nutritive salts.

To enable others skilled in the art to better understand the nature of my invention, I will now proceed to describe the same when carried into effect by applying the apparatus shown in the accompanying drawings, forming part of my specification, in which—

Figure 2:
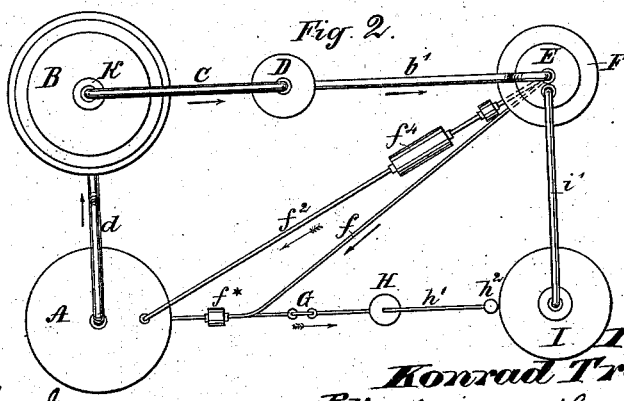

Figure 1 is a front view, partly in section, of my improved apparatus for producing sugar from sugary substances, while Fig. 2 is a plan view of the main parts of the same, such as are required for setting clear the nature of my invention.

Reference being had to the accompanying drawings, A represents an air-tight receptacle, made of copper or other suitable metal, having a conical sieve-bottom, $a$, and being entered by the steam-pipe $b$, which is arranged in the shape of a serpentine near the sides of the bottom of the receptacle A, and supplied with steam from any suitable source.

$c$ is a removable bottom piece or plug suitably fastened in the lower end of the receptacle A, and $d$ is a pipe connecting the latter with a refining apparatus, B, of the usual and well-known construction.

C is an outlet-pipe from the refining apparatus B, in which is inserted a filter, K, containing pieces of lime or chalk; and D is a cooler or dephlegmating apparatus entered by the said pipe C. The cooler D is of the usual and well-known construction, being provided with two partitions connected by a series of pipes open at both ends, and the cooling-water from any suitable source entering the space between the said partitions through the pipe $a'$, and flowing off through the waste-delivery or overflow pipe $a^2$.

$b^2$ is a pipe connecting the cooler D with the refining apparatus B, and $b'$ is a pipe connecting the said cooler D with the cooler or condenser E, which may be of any convenient and well-known construction. In the present instance the said condenser E is supplied through the pipe $e'$ with cooling-water from any suitable source, while the waste water flows off through the overflow-pipe $e^2$. The condenser E is arranged upon an air-tight reservoir, F, which serves for the reception of condensed alcohol.

$f$ is a pipe connecting the reservoir F with the lower part of the receptacle A, said pipe being provided with the stop-cock $f'$ and the non-return or check valve $f^*$.

$f^2$ is a connecting-pipe between the upper part of the receptacle A and the reservoir F, which is provided with the stop-cock $f^3$, and is partly constructed in the form of a serpentine, so as to offer an extensive area to the heating action of steam or hot water, which may be supplied, if required, to its surrounding steam or hot-water chamber $f^4$ from any suitable source of steam or hot water.

H is a filter containing pieces of lime or chalk, or other suitable material impregnated with a solution of lime, and I is a vessel having double walls for the reception of hot water or low steam from any suitable source, and being provided at its lower end with a removable bottom or plug, $i^2$, held and packed therein in any convenient and well-known manner.

G is a telescopic siphon-pipe, which allows of being adjusted in a vertical direction, and is provided with the stop-cock $g'$ and a suitable check-valve, $g^*$. This siphon-pipe G connects the lower part of the receptacle A with the filter H, while the connection between the latter and the vessel I is established by means of the connecting pipe $h'$, in which is inserted an areometer, $h^2$, of the usual and well-known construction.

$i'$ is a pipe connecting the vessel I with the condenser E, and J is an air-pipe between the reservoir F and the receptacle A. The pipe J, near its end adjacent to the receptacle A, is provided with a stop-cock, $l$, and near its middle is entered by the serpentine pipe $j'$, which is open at its outer end and surrounded by a suitable water-chamber, the latter being supplied with cooling-water from any suitable source through the pipe $j^2$, the waste water flowing off through the overflow-pipe $j^3$.

$d'$ is an overflow-pipe connected with the lower part of the refining apparatus B.

Having thus described the general construction of my improved apparatus adapted for carrying into effect my said improved process of producing sugar from sugary substances, I will now proceed to describe its operation when employed for the purposes of my invention.

The receptacle A having been filled to about three-fourths of its height with the comminuted sugary substances, steam is supplied to the serpentine $b$, and the stop-cock $f'$ of the pipe $f$ opened, so that the highly-rectified alcohol which is contained in a liquid state in the reservoir F will run down through the pipe $f$ into the lower part of the receptacle A, where it is at once converted into alcohol-steam by the heated serpentine $b$. The alcohol-steam thus produced will pass in an upward direction through the mass of comminuted sugary substances within the receptacle A and absorb part of their water, whereupon it will enter the pipe $d$, and through the same the refining apparatus B, in which it will rise and, in the manner well known, be freed of the greater part of its water, the latter flowing down into the lower or bottom part of the refining apparatus, to be educted therefrom through the waste-delivery or overflow pipe $d'$, after it has risen therein to a certain height. The alcohol-steam leaves the refining apparatus B through the pipe C in a considerably-rectified state, passes through the lime or chalk filter K, which will absorb such volatile acids as may have combined with the alcohol-steam during its passage through the sugary substances, and then enters the cooler or dephlegmating apparatus D, where it is freed of the remainder of its aqueous parts or phlegm, the latter being returned through the pipe $b^2$ to the refining apparatus B, while the alcohol-steam, which is now in a highly-rectified state again, passes through the pipe $b'$ and enters the cooler or condenser E, to be condensed into its original liquid state, and then be delivered into the reservoir F again, whence it will commence, through the pipe $f$, the same circulation as above described, until it has absorbed and carried off all the water contained in the sugary substances. The pipe $f$ is provided with a check-valve, $f^*$, in order to prevent the alcohol-steam produced in the lower part of the receptacle A from throwing back the alcohol in the pipe $f$ into the reservoir F and the parts connected therewith. All the water having thus been removed from the sugary substances the cock $f'$ of the pipe $f$ is closed, the steam entering the serpentine $b$ is cut off, and the cock $f^3$ of the pipe $f^2$ opened, so that the liquid alcohol will now flow down upon the sugary substances, and thoroughly soak or impregnate the same, in order to extract the sugar therefrom by forming an alcoholic solution or liquor with the sugary component parts of the said sugary substances. The liquid alcohol from the reservoir F enters the receptacle A at a temperature of about 120° to 150° Fahrenheit, and such temperature may be readily maintained by condensing the alcohol-steam in the condenser E, so as to give it the said temperature; but in case of an artificial heating of the liquid alcohol being required, steam or hot water may be supplied to the chamber $f^4$, surrounding the serpentine part of the pipe $f^2$, as will be readily understood. As the alcoholic liquor in the receptacle A commences gradually to rise, the cock $g'$ of the siphon-pipe G is opened, and when the level of the alcoholic liquor has risen to a line above the upper end of the said siphon-pipe the said liquor will be drawn through the siphon-pipe G and flow through the lime or chalk filter H, to neutralize such acid salts as may have combined with the alcoholic liquor. The latter will then pass into the heated vessel I, where the alcohol is separated from the sugar by converting the former into alcohol-steam, which will ascend through the pipe $i'$, leading to the condenser E, to be condensed into liquid alcohol and delivered into the reservoir F again, whence it will commence, through the pipe $f^2$, the same circulation as above described, until it has extracted all the sugar from the sugary substances in the receptacle A. This may be readily seen from the indications of the areometer $h^2$, inserted in the pipe $h'$, as is well understood. The alcohol returned to the reservoir F from the vessel I will require no rectification whatever, since it has not absorbed any water during its circulation as an extracting agent. The sugar from the sugary substances is thus collected in a pure state in the vessel I, and may be readily obtained therefrom by removing the removable bottom $i^2$. The air-pipe J between the reservoir F and the receptacle A, by opening its stop-cock $l$ during the extraction of the sugar from the sugary substances, serves the purpose of maintaining the circulation of the liquid alcohol and the operation of the siphon G, as will be readily understood. The serpentine $j'$, forming a part of the said air-pipe, is provided in order to prevent from escaping such alcohol-steam as might enter the pipe J from the reservoir F, by means of condensing said steam into liquid alcohol again and returning the latter through the inclined part of the said pipe J to the said reservoir F. All the sugar having been extracted from the sugary substances in the receptacle A, the stop-cocks of the pipes $f, f^2$, G, and J are closed, and steam is supplied to the serpentine $b$ again, in order to free the said extracted substances from the remaining traces of alcohol, which will be converted into alcohol-steam and pass through the pipe $d$, the refining-column B, pipe C, &c., to the condenser E, where the steam is condensed into liquid form and delivered into the reservoir F. The residuum of the sugary substances is then taken out of the receptacle A by removing the bottom $c$ of the latter, and may be pressed into cakes, stored away, and afterward used as a most valuable food for cattle.

I am well aware of the fact that heretofore various experiments have been made to extract in a direct way the sugar from sugary substances by means of some suitable solvent; but all such experiments have failed, partly for the reason that the sugar extracted would combine with the non-sugary component parts of the sugary material, and thus render a subsequent refining indispensable, and partly because the sugar itself would change into inverted sugar, which would cause a considerable loss of crystallizable sugar. It is also known to me that alcohol has been used experimentally for the purpose of insulating the sugar from sugary substances; but all the attempts made in this respect have failed likewise. In one instance it has been tried to macerate by means of alcohol the dried shavings of beet-root; but such process would allow of insulating a limited percentage only of the crystallizable sugar originally contained in the said sugary substances, since, first, in consequence of the drying of the latter, the acids were concentrated in the juice and would act so as to change or "invert" the sugar, and, then, for the reason that in consequence of drying the said sugary substances by means of a drying process the albuminates and the protoplasm would coagulate and close the cells, and the latter would thus retain part of the sugar, so that a complete extraction was utterly impossible.

I am also aware of another experiment that has been made to extract the sugar by means of alcohol; but in this instance the sugary substances were previously treated with lime, and the residuary mass obtained therefrom could not be used any more as food for cattle.

In a third instance which I am aware of, alcohol has been used in the manufacture of sugar as a refining or precipitating agent, with a view to dispense with the bone-black generally used for refining sugar.

Experiments have also been made to lixiviate with alcohol sugary substances in their native state; but the alcoholic solution thereby obtained would contain about fifty per cent. of water and considerable quantities of non-sugary component parts of the said sugary substances, particularly of salts soluble in aqueous alcohol, and said non-sugary component parts and salts could not be removed without employing the usual and well-known processes, while, furthermore, in condensing the watery alcoholic solution containing considerable quantities of volatile and non-volatile acids and acid salts, a considerable part of the sugar was changed into inverted sugar under the action of the concentrated acids.

I obviate all the above-mentioned difficulties by my improved process of previously freeing the sugary substances of their water by means of alcohol-steam, and then extracting by means of hot rectified alcohol the sugar from the mass of sugary substances thus freed of their water, and parting from the alcoholic liquor thereby obtained such acid salts as may be contained therein, by passing the said alcoholic liquor through a filter composed of lime or chalk, while at the same time I obtain by my improved process a valuable and nutritious food for cattle by leaving in the residuary mass of the sugary substances nearly all their original azotic component parts and nutritive salts.

I wish it to be distinctly understood that I do in no wise confine myself to applying the improved apparatus hereinbefore described for carrying into effect my improved process of producing sugar from sugary substances, and that I claim the right of making use of any suitable apparatus adapted for practicing my said improved process, without thereby deviating from the nature of my invention.

I wish it also to be understood that I propose to apply my improved process and apparatus for producing sugar from sugary substances of any nature, and that I do not limit my invention to producing a certain kind of sugar, but claim the employment of the same for the purpose of producing cane-sugar, beet-sugar, starch-sugar, or any other kind of sugar.

When applying my improved process and apparatus for the purpose of producing starch-sugar, the sugary glucose is treated in exactly the same manner as hereinbefore described with reference to any other sugary substances, and I obtain the starch-sugar in a pure state in the said vessel I, while dextrine and amylin will form the residuum of the extracted glucose in the receptacle A.

I furthermore wish it to be understood that I do not confine myself to converting the alcohol into alcohol-steam as it enters the receptacle containing the sugary substances, but that I may as well mix the said substances with liquid alcohol in said receptacle, and then convert the alcohol into steam, so that the latter will carry along with it, in the manner above described, the water it has absorbed from the sugary substances, as will be readily understood.

Having thus described my invention, what I claim as new, and desire to secure by Letters Patent, is—

1. In the manufacture of sugar, the process of freeing the sugary substances of their water by means of alcohol-steam, substantially as and for the purpose set forth.

2. In the manufacture of sugar, the process of first freeing the sugary substances of their water by means of alcohol-steam, and then extracting the sugar from the said substances by means of rectified alcohol, substantially as and for the purpose specified.

3. In the manufacture of sugar, the process of first freeing the sugary substances of their water by means of alcohol-steam, then extracting the sugar from the said substances by means of rectified alcohol, and finally passing the alcoholic solution of sugar thus obtained through a filter composed as described, substantially as and for the purpose set forth.

4. In an apparatus for producing sugar from sugary substances, the combination, with the receptacle A, of the reservoir F, the pipe $f$, having the check-valve $f^*$, the pipe $d$, the refining apparatus B, and the filter K, substantially as and for the purpose specified.

5. In an apparatus for producing sugar from sugary substances, the combination, with the receptacle A, of the reservoir F, the pipe $f^2$, the air-pipe J, having the serpentine pipe $j'$, and the siphon-pipe G, substantially as and for the purpose set forth.

6. In an apparatus for producing sugar from sugary substances, the combination, with the receptacle A, of the siphon-pipe G, the filter H, and the vessel I, substantially as and for the purpose specified.

In testimony whereof I have signed my name to this specification in the presence of two subscribing witnesses.

KONRAD TROBACH.

Witnesses:
B. ROI,
ROBERT R. SCHMIDE.